United States Patent
Corcoles-Gonzalez et al.

(10) Patent No.: US 11,295,223 B2
(45) Date of Patent: Apr. 5, 2022

(54) QUANTUM FEATURE KERNEL ESTIMATION USING AN ALTERNATING TWO LAYER QUANTUM CIRCUIT

(71) Applicant: International Business Machines Corporation, Armonk, NY (US)

(72) Inventors: Antonio Corcoles-Gonzalez, Mount Kisco, NY (US); Paul Kristan Temme, Ossining, NY (US); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 797 days.

(21) Appl. No.: 16/185,616

(22) Filed: Nov. 9, 2018

(65) Prior Publication Data

US 2019/0378025 A1    Dec. 12, 2019

Related U.S. Application Data

(60) Provisional application No. 62/684,149, filed on Jun. 12, 2018.

(51) Int. Cl.
*G06N 5/04* (2006.01)
*G06N 10/00* (2022.01)
*G06N 20/00* (2019.01)

(52) U.S. Cl.
CPC .............. *G06N 5/047* (2013.01); *G06N 10/00* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 7,113,967 B2 | 9/2006 | Cleve et al. | |
| 7,760,933 B2 | 7/2010 | Nagao | |
| 9,904,659 B1 | 2/2018 | Stupp et al. | |
| 2006/0074821 A1* | 4/2006 | Cristianini | G06N 20/00 706/12 |
| 2016/0328253 A1 | 11/2016 | Majumdar | |
| 2018/0114145 A1 | 4/2018 | Holtmann-Rice et al. | |

FOREIGN PATENT DOCUMENTS

WO    2008154657    12/2008

OTHER PUBLICATIONS

Havlicek et al., Supervised learning with quantum enhanced feature spaces, arXiv:1804.11326v1 [quant-ph] Apr. 30, 2018, pp. 1-21 (Year: 2018).*

(Continued)

*Primary Examiner* — Alan Chen
(74) *Attorney, Agent, or Firm* — Amin, Turocy & Watson, LLP (57) ABSTRACT

Techniques and a system to facilitate quantum computation are provided. In one example, a system includes a processor that executes computer executable components stored in a memory; a quantum feature map circuit component that estimates a kernel associated with a feature map; and a support vector machine component that performs a classification using the estimated kernel.

20 Claims, 6 Drawing Sheets

(56) References Cited

OTHER PUBLICATIONS

Li et al., Experimental Realization of a Quantum Support Vector Machine, Physical Review Letters, PRL 114, May 14, 2004 (2015), Total p. 5 (Year: 2015).*
Chatterjee et al., Generalized Coherent States, Reproducing Kernels, and Quantum Support Vector, arXiv:1612.03713v2 [quant-ph] Feb. 2, 2017, pp. 1-8 (Year: 2017).*
Liu et al., Quantum machine learning for quantum anomaly detection, Physical Review A 97, Apr. 23, 2015 (2018), Total p. 10 (Year: 2018).*
Rebentrost et al., Quantum Support Vector Machine for Big Data Classification, PRL 113, May 13, 2003 (2014), Total p. 5 (Year: 2014).*
Nasios et al., "Kernel-based classification using quantum mechanics," ScienceDirect, Pattern Recognition 40, 2007, pp. 875-889, 15 pages.
Cortes et al., "Support-Vector Networks," Machine Learning, 20, 1995, pp. 273-297, 25 pages.
Rebentrost et al., "Quantum Support Vector Machine for Big Data Classification," Physical Review Letters, Sep. 26, 2014, 5 pages.
Schuld et al., "Quantum machine learning in feature Hilbert spaces," arXiv:1803 07128v1 [quant-ph], Mar. 19, 2018, 12 pages.
International Search Report and Written Opinion received for PCT Application Serial No. PCT/EP2019/064728 dated Sep. 13, 2019, 13 pages.
Havlicek et al., "Supervised learning with Quantum Enhanced Feature Spaces", XP055618269, Jun. 5, 2018, 22 pages.

\* cited by examiner

QUANTUM FEATURE KERNEL ESTIMATION USING AN ALTERNATING TWO LAYER QUANTUM CIRCUIT

BACKGROUND

The subject disclosure relates generally to quantum computing. Quantum computing employs quantum physics principles to encode and manipulate information rather than relying upon classical models of computation. For example, a quantum circuit can employ quantum bits (e.g., qubits) that may be put in a superposition and/or entanglement state, based upon principles of quantum physic. The superposition principle of quantum physics allows each qubit to represent both a value of "1" and a value of "0" at the same time (along with complex valued phase). The entanglement principle of quantum physics states allows qubits to be correlated with each other in a way that has no parallel in classical computation. For instance, a state of a first value (e.g., a value of "1" or a value of "0") can depend on a state of a second value. As such, a quantum circuit can employ qubits and quantum gates to encode information rather than binary digital techniques based classical binary bits and classical gates. A key differentiating aspect of quantum from classical computation, is that the state of an n qubit system, may require $2^n$ complex values for its representation, as opposed to n binary numbers for an n classical bits register. This exponential difference in the state space dimension, can be instrumental in acceleration of computation.

With respect to classical computational techniques, kernel methods for machine learning are ubiquitous in pattern recognition, with support vector machines (SVM) being the most well-known methods for classification problems. However, there are limitations to successful solution to such problems when a feature space becomes large, and kernel functions become computationally expensive to estimate. For SVM, data is mapped non-linearly to a high dimensional space, the feature space, where a hyperplane is constructed to separate labeled samples. An SVM for arbitrarily high dimensional feature maps can be constructed if one can efficiently evaluate inner products of mapped data—this inner-product is referred to as a kernel.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for facilitating quantum feature kernel estimation are described.

A quantum advantage can only be obtained in principle, when a kernel cannot be estimated classically. To obtain an advantage over classical approaches what is needed is to implement a map based on circuits that are hard to simulate classically.

According to an embodiment, a system can comprise a processor that executes computer executable components stored in a memory; a quantum feature map circuit component that estimates a kernel associated with a feature map; and a support vector machine component that performs a classification using the estimated kernel.

In a non-limiting implementation, the quantum feature map circuit comprises a first layer of Hadamard gates operatively coupled to a first global phase gate operatively coupled to a second layer of Hadamard gates operatively coupled to a second global phase gate.

In another non-limiting implementation, the kernel is a matrix of data mapped to a quantum state after a feature map.

In yet another non-limiting implementation, the feature map is un-evaluable with fewer than exponential classical resources corresponding to available qubits of the quantum feature map circuit.

In a non-limiting implementation, the quantum feature map circuit is operable in a setting with bounded coherence.

In another non-limiting implementation, the first global phase gate is defined by a sequence of microwave pulses parameterized by waveform, amplitude and time.

In yet another implementation, the first global phase gate is defined by a sequence of single and two qubit phase gates that entangle all qubits in the feature map.

Other embodiments include methods and/or computer program products that implement the foregoing implementations.

Appendix A, which forms part of this specification, is a paper detailing aspects of innovations and implementations in accordance with one or more embodiments described herein.

Appendix B, which forms part of this specification, is a presentation detailing aspects of innovations and implementations in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Machine learning and quantum computing are two technologies each with the potential for altering how computation is performed to address previously untenable problems. Kernel methods for machine learning are ubiquitous for pattern recognition, with support vector machines (SVMs) being the most well-known method for classification problems. However, there are limitations to the successful solution to such problems when the feature space becomes large, and the kernel functions become computationally expensive to estimate. A core element to computational speed-ups afforded by quantum algorithms is the exploitation of an exponentially large quantum state space through controllable entanglement and interference.

Two novel systems/methods utilizing a superconducting processor are disclosed herein that represent a feature space of a classification problem by a quantum state, taking advantage of the large dimensionality of quantum Hilbert space to obtain an enhanced solution. One method, a quantum variational classifier builds on and operates through using a variational quantum circuit to classify a training set in direct analogy to conventional SVMs. In the second, a quantum kernel estimator is employed to estimate the kernel function and optimize the classifier directly. The two systems/methods present a new class of tools for implementing applications of noisy intermediate scale quantum computers to machine learning.

More particularly, kernel methods for machine learning are ubiquitous in pattern recognition, with support vector machines (SVM) being one of the most well-known classifiers employed for classification problems. However, there are limitations to successful solution to such problems when a feature space becomes large, and kernel functions become computationally expensive to estimate. For SVM, data is mapped non-linearly to a high dimensional space, the feature space, where a hyperplane is constructed to separate labeled samples. One can construct the SVM for arbitrarily high dimensional feature maps if one can efficiently evaluate inner products of mapped data—this inner-product is referred to as kernel. A quantum advantage is obtained in principle, when the kernel cannot be estimated classically. To obtain an advantage over classical approaches a map based on circuits is implemented that is hard to simulate classically.

The intersection between machine learning and quantum computing has been dubbed quantum machine learning, and has attracted considerable attention in recent years. A quantum algorithm is presented that can run on near-term quantum devices. A natural class of algorithms for such noisy devices are short-depth circuits, which are amenable to error-mitigation techniques that reduce effect of decoherence. There are convincing arguments that indicate that even very simple circuits are hard to simulate by classical computational means. The subject algorithm takes on the original problem of supervised learning: the construction of a classifier. For this problem, we need to classify data from a particular set labeled by a map unknown to the algorithm. We are given data from a training set T and a test set S both subsets of the problem set. The training algorithm receives, along with the training data, its labels. The goal is to infer an approximate map on the test set such that it agrees with high probability with the true map on the test data. For such a learning task to be meaningful it is assumed that there is a correlation between the labels given for training and the true map. A classical approach to constructing an approximate labeling function uses support vector machines (SVMs). The data is mapped non-linearly to a high dimensional space, the feature space, where a hyperplane is constructed to separate the labeled samples. A quantum version of this approach is available and provides for an exponential improvement if data is provided in a coherent superposition. However, when data is provided in a conventional way, e.g., from a classical computer, then the methods of the aforementioned quantum version cannot be applied.

Here, we disclose two SVM type classifiers that process data provided purely classically and use quantum state space as the feature space to still obtain a quantum advantage. This is done by mapping the data non-linearly to a quantum state. Both classifiers can be implemented on a superconducting quantum processor. In the first approach a variational circuit generates a separating hyperplane in quantum feature space. In the second approach quantum computer is used to estimate kernel function of the quantum feature space directly and implement a conventional SVM. A necessary condition to obtain a quantum advantage, in either of the two approaches, is that the kernel cannot be estimated classically. This is true, even when complex variational quantum circuits are used as classifiers.

Thus, the herein disclosed innovations provide advantages over classical computational approaches where certain high-dimensional problems render the classical approach impracticable due to computational cost and/or time-based cost. Utilization of quantum computing in connection with at least a portion of problem solving provides advantages associated with the power of quantum computing in connection with high-complex problems where classical computing is inefficient.

Quantum Computing Overview

The following description is intended to serve as a high-level overview of quantum computing in order to foster a basic understanding of the concepts utilized herein. The following description is not intended as an exhaustive description of quantum computing but is instead given as background information relating to various aspects of quantum computing that are utilized by one or more embodiments described herein.

Quantum computing is fundamentally different from classical computing in regard to bit structures. For instance, while classical computers use bits that can only hold a value of either 0 or 1, the basic quantum computing unit is a quantum bit, or qubit, which, besides being in the traditional states 0 or 1, denoted herein as $|0\rangle$ and $|1\rangle$ and termed the computational basis states, can also be in a superposition (i.e., linear combination) of both. This superposition can be given as the following:

$$|q\rangle = \alpha|0\rangle + \beta|1\rangle,$$

where the complex coefficients $\alpha$ and $\beta$ are called the probability amplitudes, in that $|\alpha|^2$ and $|\beta|^2$ represent the probabilities of outcomes $|0\rangle$ and $|1\rangle$ upon measuring the qubit. The above is given in terms of probabilities and measurements because the superposition of a qubit collapses to either of the computational basis states upon measurement. Further, because of the nature of probabilities, $\alpha$ and $\beta$ follow the constraint $|\alpha|^2 + |\beta|^2 = 1$.

As an example, to illustrate the above, a single qubit has two possible outcomes upon measurement, namely $|0\rangle$ and $|1\rangle$. Thus for a single-qubit system, the state vector of the system can be given as $[\alpha,\beta]^T$, which contains the two probability amplitudes corresponding to the two possible outcomes. If a qubit is initialized to be in the $|0\rangle$ (or $|1\rangle$) state, then the state vector of the qubit would be $[1,0]^T$ (or $[0,1]^T$), indicating that the measurement outcome would be a deterministic $|0\rangle$ (or $|1\rangle$) at this point.

In an aspect, qubits can be interpreted geometrically, e.g., each qubit can be thought of as a vector from the origin to a point on the 3-D unit-sphere, referred to as the Bloch sphere, where the north (+Z) and south (−Z) poles correspond to the $|0\rangle$ and $|1\rangle$ states. Further, in a similar manner to the classical AND/OR/NOT gates that can be applied to classical bits to manipulate their values, qubits can similarly be acted upon by quantum gates. Based on the Bloch sphere construction given above, three single-qubit quantum gates, known as the Pauli gates, can rotate the qubit along the three axes. Specifically:

$$\text{Pauli-}X = \begin{bmatrix} 0 & 1 \\ 1 & 0 \end{bmatrix}, \quad \text{Pauli-}Y = \begin{bmatrix} 0 & -i \\ i & 0 \end{bmatrix}, \quad \text{Pauli-}Z = \begin{bmatrix} 1 & 0 \\ 0 & -1 \end{bmatrix}.$$

The Pauli-X gate can transform a state $\alpha|0\rangle+\beta|1\rangle$ to $\beta|0\rangle+\alpha|1\rangle$ (e.g., from $|0\rangle$ to $|1\rangle$, and from $|1\rangle$ to $|0\rangle$), similar to the NOT gate used in classical computers. Pauli-Z, on the other hand, transforms a state from $|1\rangle$ to $-|1\rangle$ (e.g., by flipping the phase). Other single-qubit and multiple-qubit quantum gates can also be used, as will be described in further detail below.

Another single-qubit quantum gate is the Hadamard gate, which can be used to place a deterministic qubit into a superpositioned state. In an aspect, the single-qubit Hadamard gate is equivalent to the 2×2 matrix $$H = \frac{1}{\sqrt{2}}\begin{bmatrix} 1 & 1 \\ 1 & -1 \end{bmatrix}.$$

With regard to a $|0\rangle$ qubit, a Hadamard gate has the following effect:

$$\frac{1}{\sqrt{2}}\begin{bmatrix} 1 & 1 \\ 1 & -1 \end{bmatrix} \cdot \begin{bmatrix} 1 \\ 0 \end{bmatrix} = \frac{1}{\sqrt{2}}\begin{bmatrix} 1 \\ 1 \end{bmatrix},$$

which would result in the qubit having a value of either $|0\rangle$ or $|1\rangle$ when measured, both with probability $$\left(\frac{1}{\sqrt{2}}\right)^2 = \frac{1}{2}.$$

Therefore, the output qubit is placed in a superpositioned state, being both $|0\rangle$ and $|1\rangle$ at the same time until the state collapses due to measurement.

In an aspect, the $$\frac{1}{\sqrt{2}}$$

factor in the Hadamard matrix accounts for the fact that quantum gates manipulate quantum state vectors comprised of probability amplitudes, which are constrained in that probabilities for a given set of quantum states will sum to 1. Quantum operations, therefore, are unitary from the point of view of their equivalent matrices, which essentially make quantum gates operators that rotate quantum unit-length state vectors on their respective high-dimensional unit spheres.

In a similar manner to the single-qubit cases described above, for a 2-qubit system $|q_0q_1\rangle$, there are $2^2=4$ possible measurement outcomes, namely $|00\rangle$, $|01\rangle$, $|10\rangle$, or $|11\rangle$. These outcomes correspond to the state vector $[\alpha,\beta,\gamma,\delta]^T$. In other words, the 2-qubit system is described as follows:

$$|q_0q_1\rangle = \alpha|00\rangle + \beta|01\rangle + \gamma|10\rangle + \delta|11\rangle.$$

Similar to the single-qubit scenario, the probability for each of these outcomes sums to 1, i.e., $|\alpha|^2+|\beta|^2+|\gamma|^2+|\delta|^2=1$.

If both qubits are initialized as $|0\rangle$ and then passed through Hadamard gates, the result is a uniformly superpositioned state vector $$\left[\frac{1}{2}, \frac{1}{2}, \frac{1}{2}, \frac{1}{2}\right]^T,$$

with the same $$\left(\frac{1}{2}\right)^2 = \frac{1}{4}$$

probability for each of the four outcomes upon measurement.

In an aspect, it is the nature of quantum superposition that grants quantum computing its exponential scalability over classical computing. Most, if not all, quantum algorithms proceed by first putting qubits into a superpositioned state, then carrying out a series of one or more unitary operations over the qubits, before taking the final measurement for the outcome. A representative of such quantum algorithms is the Grover's Search algorithm, which exploits the nature of quantum superposition and achieves searching through an unordered list of N items with only $O(\sqrt{N})$ lookups, as opposed to the classical realm, in which an average of $$\frac{N}{2}$$

(or $\Omega(N)$) lookups would be conducted. The Grover's Search algorithm is described in more detail below.

Besides superposition, another distinguishing property of quantum computing is quantum entanglement, which can be loosely pictured as the correlation among qubits in a multi-qubit system. If the multiple qubits are prepared or operated on in ways that entangle them together, the individual qubits then cannot be described independently from each other, e.g., measuring one will determine the outcome of its entangled counterparts.

A concrete example of quantum entanglement will now be described with respect to the two-qubit system $|q_0q_1\rangle$ given above in its uniformly superpositioned state after the operations of Hadamard gates from our previous example:

$$|q_0q_1\rangle = \tfrac{1}{2}|00\rangle + \tfrac{1}{2}|01\rangle + \tfrac{1}{2}|10\rangle + \tfrac{1}{2}|11\rangle.$$

In the event that $|q_0\rangle$ is measured and exhibits a value of $|0\rangle$, then the whole 2-qubit state becomes as follows:

$$|q_0q_1\rangle_{|q_0\rangle=|0\rangle} = \frac{1}{\sqrt{2}}|00\rangle + \frac{1}{\sqrt{2}}|01\rangle + 0|10\rangle + 0|11\rangle,$$

where $|q_1\rangle$ still has an equal probability of being measured as either $|0\rangle$ or $|1\rangle$, just like before $|q_0\rangle$ was measured. On the other hand, had $|q_0\rangle$ been measured to be $|1\rangle$, the 2-qubit state would have instead become as follows:

$$|q_0 q_1\rangle_{|q_0\rangle=|1\rangle} = 0|00\rangle + 0|01\rangle + \frac{1}{\sqrt{2}}|10\rangle + \frac{1}{\sqrt{2}}|11\rangle,$$

where $|q_1\rangle$ would be in the same situation as before, namely equal probability for $|q_1\rangle=|0\rangle$ and $|q_1\rangle=|1\rangle$. Therefore, in this case, the two qubits are not entangled, in that measuring one (and thus causing its superposition to collapse either way) has no bearing on the probability distribution of the other.

However, instead of the uniformly superpositioned state given above, the two qubits could be prepared by putting the first one through a Hadamard gate, and then both through what is known as a controlled-not gate. The outcome of the quantum circuit would be a fully entangled state, called the Bell State.

As described above, the Hadamard gate H puts $|q_0\rangle$ into a superpositioned state. The controlled-not gate then operates on the two qubits, for which the first qubit $|q_0\rangle$ is unchanged, but the amplitude of the second one $|q_1\rangle$ will be flipped (hence the "not") if and only if $|q_0\rangle=|1\rangle$ (hence the "control"). Accordingly, if the two-qubit input state $|q_0 q_1\rangle$ for a controlled-not gate is as follows:

$$|q_0 q_1\rangle_{input} = \alpha|00\rangle + \beta|01\rangle + \gamma|10\rangle + \delta|11\rangle,$$

the output state will be the following:

$$|q_0 q_1\rangle_{output} = \alpha|00\rangle + \beta|01\rangle + \gamma|11\rangle + \delta|10\rangle.$$

In the above, the $\gamma$ and $\delta$ terms for $|q_1\rangle$ flip due to the corresponding $|q_0\rangle=|1\rangle$. Rearranging the last two terms to match the order of the input state, the following is obtained:

$$|q_0 q_1\rangle_{output} = \alpha|00\rangle + \beta|01\rangle + \gamma|10\rangle + \delta|11\rangle.$$

Observing the input and output states, the equivalent unitary matrix for the controlled-not gate can be given as follows:

$$\begin{bmatrix} 1 & 0 & 0 & 0 \\ 0 & 1 & 0 & 0 \\ 0 & 0 & 0 & 1 \\ 0 & 0 & 1 & 0 \end{bmatrix}.$$

In the computational basis ($|0\rangle$ and $|1\rangle$), the controlled-not gates outputs an always unchanged $|q_0\rangle$ in addition to the $|q_1\rangle$ output due to the unitary property of quantum mechanics. More particularly, quantum operations are governed by the law that probabilities must always sum to 1. As a result of this unitarity, all quantum operations are reversible. As a result, no information, such as the above $|q_0\rangle$ in the controlled-not gate example, is discarded.

With the above understanding of the controlled-not gate, the final output two-qubit state of the circuit can be determined as follows. First, the initial state, given as $$1|00\rangle + 0|01\rangle + 0|10\rangle + 0|11\rangle,$$

subsequent to the operation of the Hadamard gate $|q_0\rangle$, becomes as follows:

$$\frac{1}{\sqrt{2}}|00\rangle + 0|01\rangle + \frac{1}{\sqrt{2}}|10\rangle + 0|11\rangle,$$

or, alternatively in terms of its state vector, $$\frac{1}{\sqrt{2}}[1, 0, 1, 0]^T.$$

Next, by applying the controlled-not gate, the following is obtained:

$$\begin{bmatrix} 1 & 0 & 0 & 0 \\ 0 & 1 & 0 & 0 \\ 0 & 0 & 0 & 1 \\ 0 & 0 & 1 & 0 \end{bmatrix} \cdot \frac{1}{\sqrt{2}} \begin{bmatrix} 1 \\ 0 \\ 1 \\ 0 \end{bmatrix} = \frac{1}{\sqrt{2}} \begin{bmatrix} 1 \\ 0 \\ 0 \\ 1 \end{bmatrix},$$

which indicates an output state of $$\frac{1}{\sqrt{2}}|00\rangle + 0|01\rangle + 0|10\rangle + \frac{1}{\sqrt{2}}|11\rangle.$$

If the zero-probability terms are omitted from the above, the output state can be simplified as follows:

$$\frac{|00\rangle + |11\rangle}{\sqrt{2}}.$$

The above is a fully entangled state in the sense that, even though each of the two qubits has a 50-50 chance of being measured as either $|1\rangle$ or $|0\rangle$, as soon as one of them is measured, the other collapses to the same outcome no matter how far apart the two entangled qubits might be at the time of the first measurement. It should be appreciated that this is different from the example of two qubits in a uniformly superpositioned state, where measuring one reveals nothing about the other.

As illustrated by the example above, multi-qubit quantum gates tend to have the effect of tangling qubits together. Besides the 2-qubit controlled-not gate, other multi-qubit gates can also be used. For example, the controlled-controlled-not (CCX) gate, also known as the Toffoli gate, is a 3-qubit gate. The CCX gate keeps the top two qubits unchanged, and flips the state of the last qubit if both of the top two qubits are $|1\rangle$. Therefore, its corresponding unitary matrix is as follows:

$$\begin{bmatrix} I_{6 \times 6} & 0 & 0 \\ 0 & 0 & 1 \\ 0 & 1 & 0 \end{bmatrix}.$$

where $I_{x \times x}$ is an identity matrix of the specified size. It can further be appreciated that the CCX gate is universal, in the same sense that the NAND gate is universal for classical computing.

In an aspect, respective quantum algorithms are designed to take advantage of the nature of superposition and entanglement of quantum systems to achieve their desired effects. By putting qubits into superpositioned states, simultaneous manipulations on multiple different inputs can be performed while carrying out the intended operation only once. Therefore, for an operation that needs to be carried out over all possible information that n bits can carry, a classical computer would utilize $2^n$ operations, one for each particular configuration of the n bits, whereas a quantum computer uses just a single operation, carried out on the superposition of all $2^n$ possible configurations, yielding an exponential speedup. However, due to the probabilistic nature of quantum systems, the outcome of a quantum algorithm can in some cases be indeterministic, in which case multiple repeated runs and measurements can be used to determine the most probable outcomes.

Figure 1:
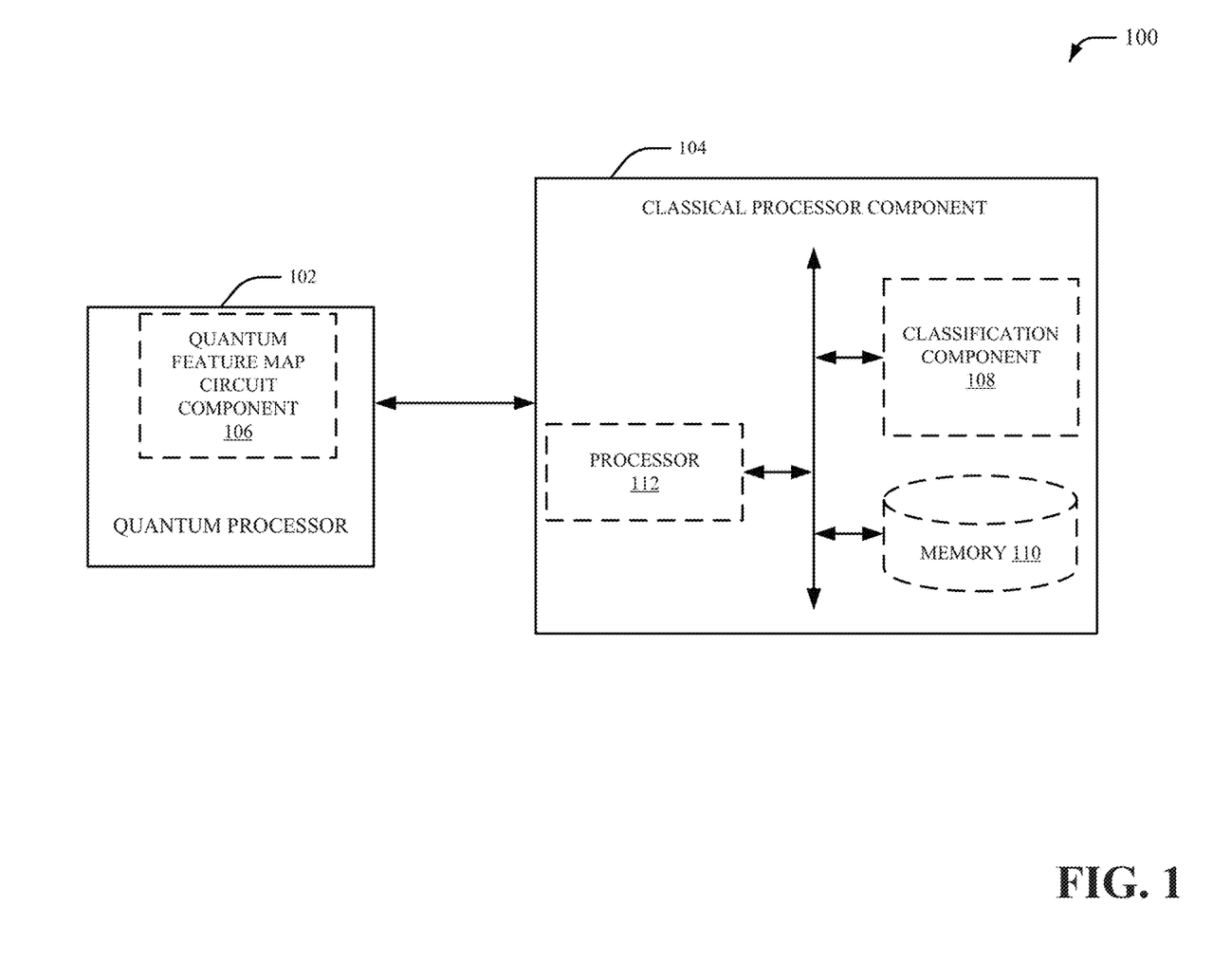
FIG. 1 illustrates a block diagram of an example, non-limiting system that includes a quantum processor and a classical processor component in accordance with one or more embodiments described herein.

FIG. 1 illustrates a block diagram of an example, non-limiting system 100. In various embodiments, the system 100 can be a quantum processing system associated with technologies such as, but not limited to, quantum processing technologies, quantum circuit technologies, quantum computing design technologies, artificial intelligence technologies, machine learning technologies, search engine technologies, image recognition technologies, speech recognition technologies, model reduction technologies, iterative linear solver technologies, data mining technologies, healthcare technologies, pharmaceutical technologies, biotechnology technologies, finance technologies, chemistry technologies, material discovery technologies, vibration analysis technologies, geological technologies, aviation technologies, and/or other technologies.

The system 100 can employ hardware and/or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized computer with a classical processor component, etc.) for carrying out defined tasks related to quantum circuit simulation.

The system 100 and/or components of the system 100 can be employed to solve new problems that arise through advancements in technologies mentioned above, computer architecture, quantum processing architecture and/or the like. One or more embodiments of the system 100 can provide technical improvements to quantum processing systems, quantum circuit systems, quantum computing design systems, artificial intelligence systems, machine learning systems, search engine systems, image recognition systems, speech recognition systems, model reduction systems, iterative linear solver systems, data mining systems, healthcare systems, pharmaceutical systems, biotechnology systems, finance systems, chemistry systems, material discovery systems, vibration analysis systems, geological systems, aviation systems, and/or other systems.

One or more embodiments of the system 100 can also provide technical improvements to a quantum processor (e.g., a quantum circuit) by improving processing performance of the quantum processor, improving processing efficiency of the quantum processor, improving processing accuracy of the quantum processor, improving timing characteristics of the quantum processor and/or improving power efficiency of the quantum processor.

In the embodiment shown in FIG. 1, the system 100 can include a quantum processor 102 and a classical processor component 104. As shown in FIG. 1, quantum processor 102 can include a quantum feature map circuit component 106. The classical processor component 104 can include a classifier component 108 (e.g., a support vector machine (SVM), neural network, or any suitable classifier), a memory 110 and a processor 112. As noted above, kernel methods for machine learning are ubiquitous for pattern recognition, with support vector machines (SVMs) being the most well-known method for classification problems. However, there are limitations to the successful solution to such problems when the feature space becomes large, and the kernel functions become computationally expensive to estimate. A core element to computational speed-ups afforded by quantum algorithms is the exploitation of an exponentially large quantum state space through controllable entanglement and interference.

The system 100 can represent a feature space of a classification problem by a quantum state, taking advantage of the large dimensionality of quantum Hilbert space to obtain an enhanced solution. For the classifier component 108 (e.g., SVM), data is mapped non-linearly to a high dimensional space, the feature space, where a hyperplane is constructed to separate labeled samples. The system 100 can construct the classifier component 108 (e.g., SVM), for arbitrarily high dimensional feature maps by efficiently evaluating inner products of mapped data—this inner-product is referred to as kernel. A quantum advantage is obtained in principle, when the kernel cannot be estimated classically. To obtain an advantage over classical approaches, the system 100 implements a map based on circuits that is difficult to simulate classically.

The system 100 mapping the data non-linearly to a quantum state. Both classifiers can be implemented on a superconducting quantum processor. In the first approach a variational circuit generates a separating hyperplane in quantum feature space. In the second approach a quantum computer is used to estimate kernel output of the data directly and implement a conventional SVM. A necessary condition to obtain a quantum advantage, in either of the two approaches, is that the kernel cannot be estimated classically. This is true, even when complex variational quantum circuits are used as classifiers.

Thus, the herein disclosed innovations provide advantages over classical computational approaches where certain high-dimensional problems render the classical approach impracticable due to computational cost and/or time-based cost. Utilization of quantum computing in connection with at least a portion of problem solving provides advantages associated with the power of quantum computing in connection with high-complex problems where classical computing is inefficient. The system 100 utilizes the quantum feature map circuit component 106 to implement an alternating N-layer (N>1) quantum circuit that depends non-linearly on input data to implement a feature map to quantum state space.

Figure 2:
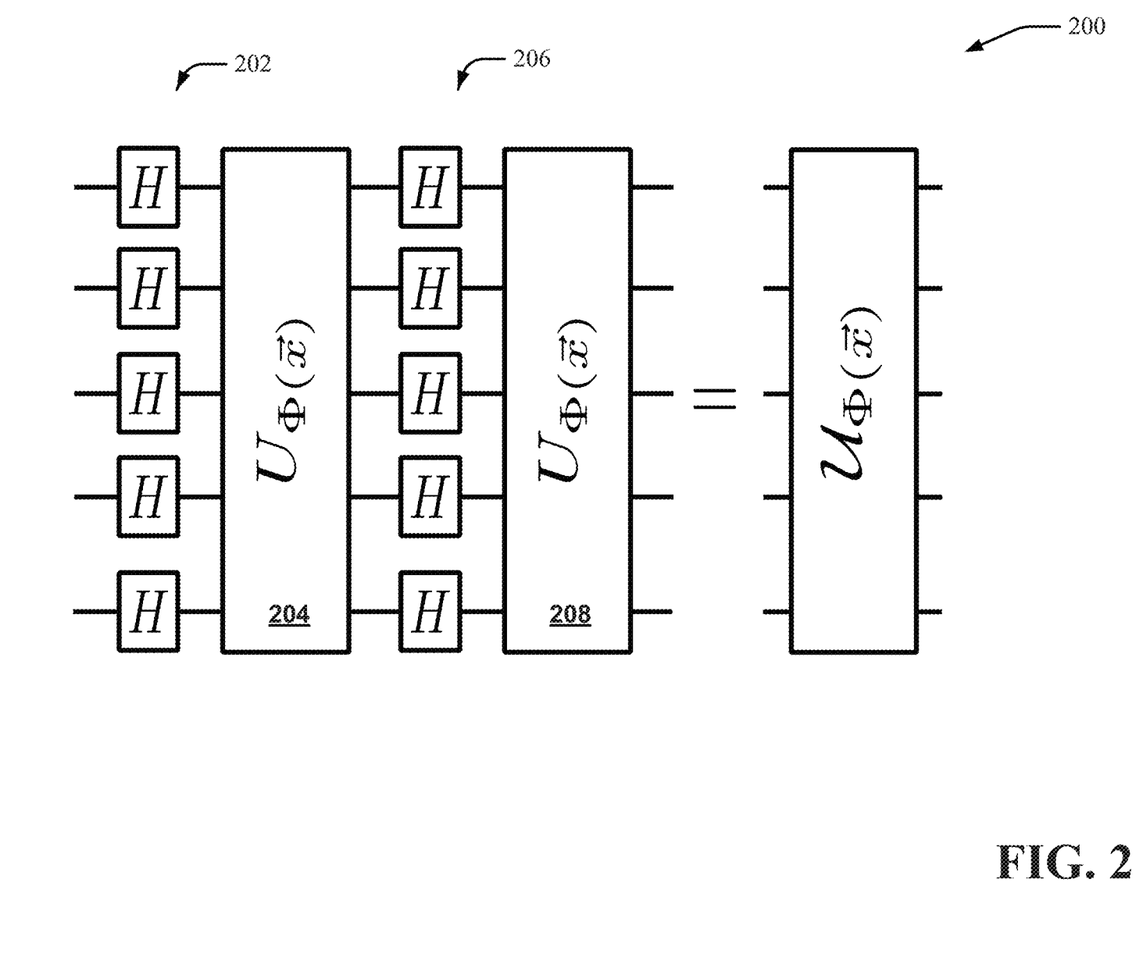
FIG. 2 illustrates an example quantum feature map circuit 200 with two alternating layers in accordance with one or more embodiments described herein.

FIG. 2 illustrates an example quantum feature map circuit component 200 (a non-limiting embodiment of quantum feature map circuit component 106 with two alternating layers); it is to be appreciated that any suitable number of layers N (N>1) can be implemented. It is to be appreciated that a single layer (N=1) would eliminate the need for a quantum computer. Generating the feature map using a single layer then one can sample the output kernel through additive error efficiently using classical techniques (e.g., Monte Carlo simulation). Thus, the subject innovation is employed in situations where classical computing is not efficient (e.g., cost prohibitive or time prohibitive), and the significant computing power of quantum computing is advantageous—when N>1, it is difficult to simulate classically. The quantum feature map circuit component 200 comprises a first layer of Hadamard gates 202 operatively coupled to a first unitary gate 204 operatively coupled to a second layer of Hadamard gates 206 operatively coupled to a second unitary gate 208. The unitary gates 204 and 208 are diagonal in the Pauli Z-basis. The gate is defined by a sequence of microwave pulses that are parameterized by waveform, amplitude and time. The gates 204 and 208 are respectively defined by a sequence of single and two qubit phase gates that entangle all qubits in the feature map. (Equation 1). The kernel is the matrix of fidelities of all pairs of data after they have been mapped to a quantum state after the feature map.

Equation 1, below illustrates a representation of a global phase gate.

EQN 1: Global Phase Gate $$U_{\Phi(\vec{x})} = \exp\left(i \sum_{S \subseteq [n]} \phi_S(\vec{x}) \prod_{i \in S} Z_i\right)$$

with Pauli matrix Z=[1 0; 0 −1] and $\phi S(\vec{x}) \in R$ and $|S|<d$ where d=2 implemented by products of $$U_{\phi_{\{k\}}(\vec{x})} = \exp(i\phi_{\{k\}}(\vec{x})Z_k)$$

$$e^{i\phi_{\{l,m\}}(\vec{x})Z_l Z_m} =$$

Equation 2 below illustrates a quadratic program for the SVM in accordance with an implementation.

EQN 2: Quadratic Program for SVM $$L_D = \sum_i \alpha_i - \frac{1}{2} \sum_{i,j} \alpha_i \alpha_j k_i k_j \vec{x}_i . \vec{x}_j,$$

subject to $0 \le \alpha \le C$, $\sum_i \alpha_i k_i = 0$.

Figure 3:
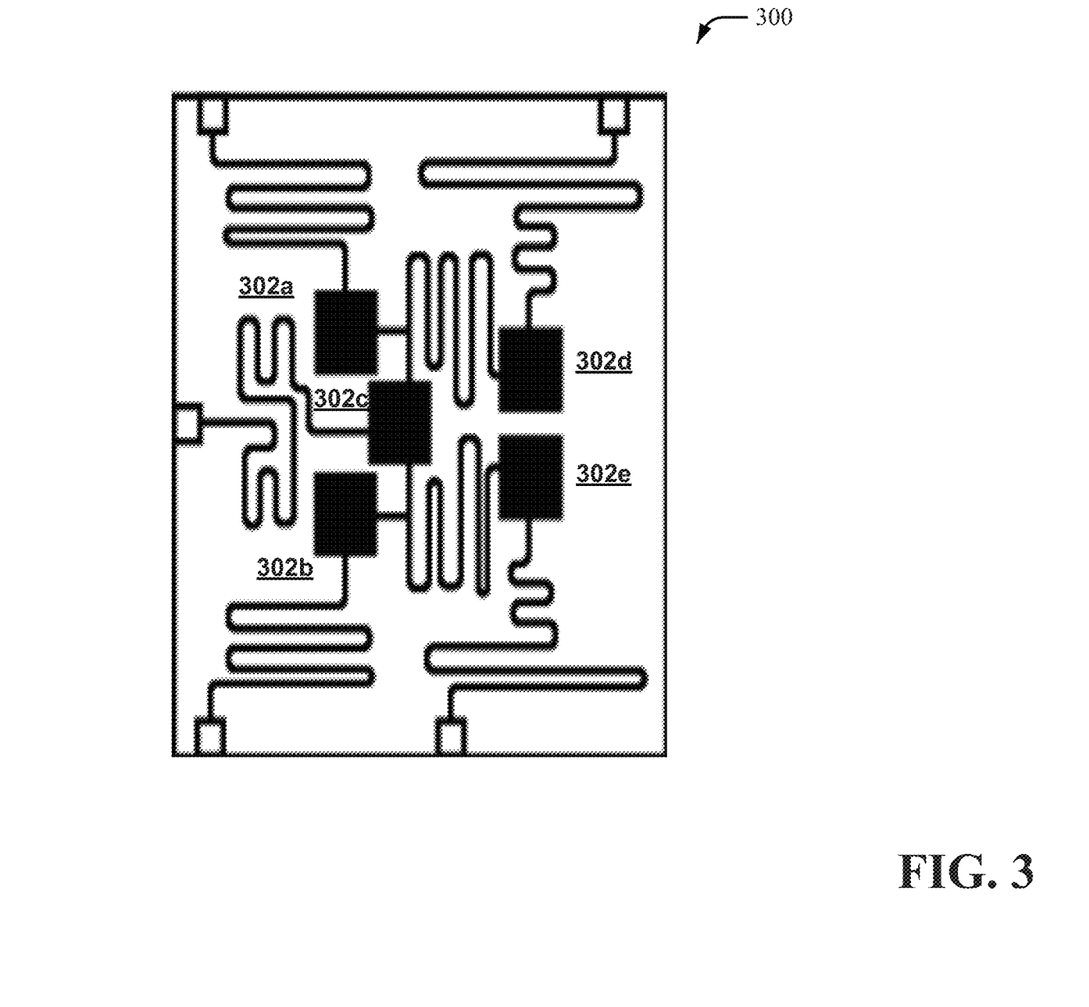
FIG. 3 illustrates a fixed frequency single-qubit architecture 300 to implement the circuit of FIG. 2 in accordance with one or more embodiments described herein.

FIG. 3 illustrates a fixed frequency single-qubit architecture 300 to implement the circuit of FIG. 2. In this implementation, five qubits 302 (302*a*-302*e*) are shown with corresponding transmission lines (resonators) and sources/drains.

System 100 employs fixed-frequency, single-qubit and quantum phase gates for feature state preparation, implemented using microwave pulses; in an implementation solely microwave pulses are employed. The microwave pulses can be parameterized by: (1) variable amplitude and phase; or (2) constant amplitude with varying phase.

Figure 4:
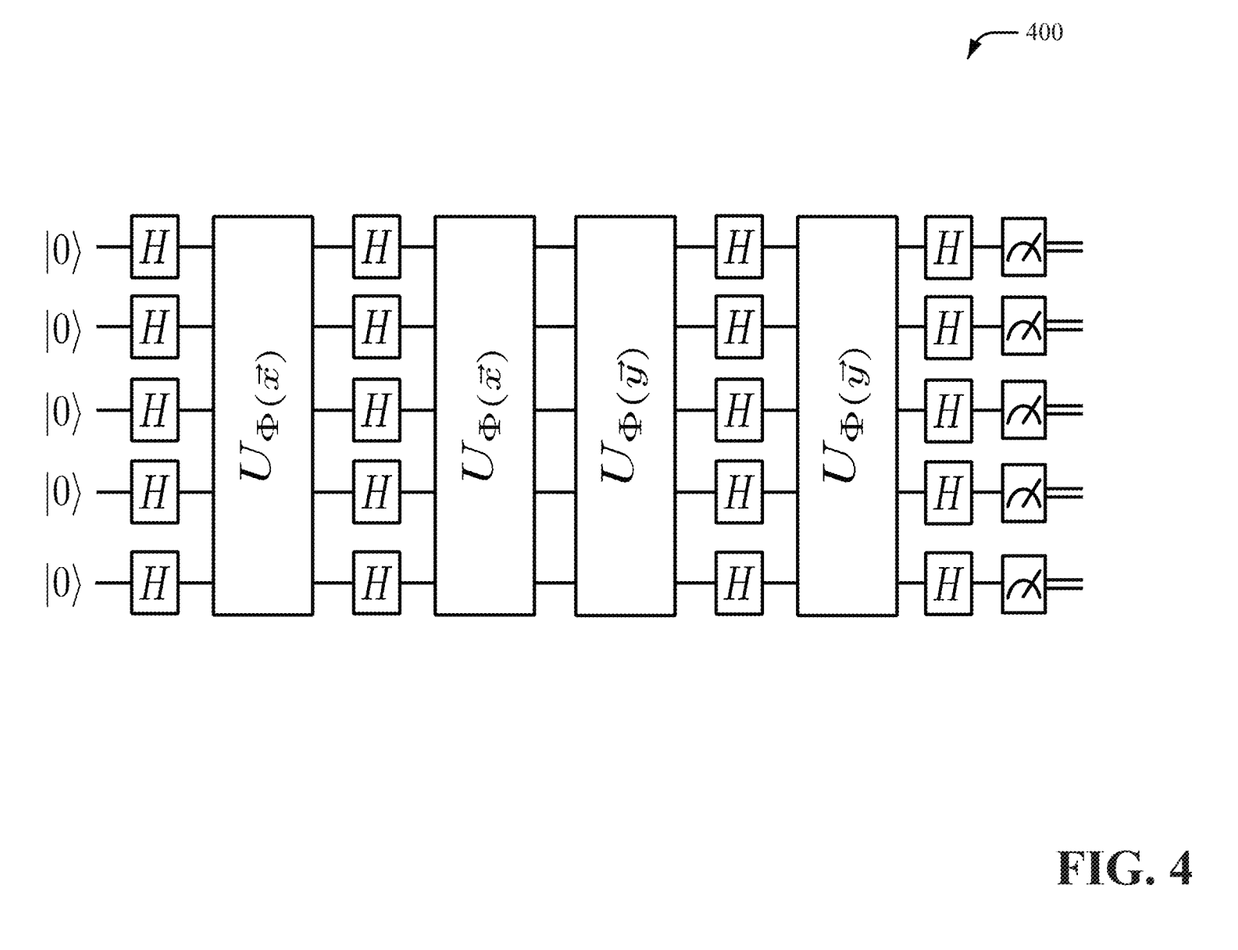
FIG. 4 illustrates a combination of two of the two-layer quantum circuits of FIG. 2 to estimate a kernel in accordance with one or more embodiments described herein.

FIG. 4 depicts a combination of two of the two-layer quantum circuits 400 to estimate the kernel. In an implementation, estimation of the kernel is performed by obtaining the probability of the output being all zeros. The figure depicts concatenation of the feature map circuit starting with all zero states, where the feature map circuit is applied, and then an inverse feature map circuit for different data, and then measure the Z basis and a set of classical bits is output that comprise zeros and ones. The kernel of interest to be estimated for the SVM is the probability of obtaining a bitstream comprising all zeros. For example, if there are 5000 bit streams and 100 of those 5000 bitstreams are all zeros, then the estimate of the kernel is calculated as: 100/5000 (e.g., [number of bitstreams that are all zero]/[total number of bitstreams]). In an implementation, the feature map is un-evaluable with fewer than exponential classical resources corresponding to available qubits of the quantum feature map circuit component 106. In an embodiment, the quantum feature map circuit component 106 is operable in a setting with bounded coherence (e.g., window for estimation of the kernel fits within a coherence window, or in other words a compact circuit). After the Kernel has been estimated the rest of the algorithm can be run on a classical computer thus only having the critical component providing the quantum advantage run on the quantum computer. A quantum classical hybrid—algorithm that is guaranteed to converge since it inherits a convergence guarantee from classical SVMs.

Below is a listing of experimental protocol definitions in accordance with innovation(s) described herein.

Experimental Protocol: Definitions

The gate is defined by a sequence of microwave pulses that are parameterized by waveform, amplitude and time.

The global phase gate is defined by a sequence of single and two qubit phase gates that entangle all the qubits in the feature map EQN2.

The feature map circuit is defined as a layer of Hadamard gates followed by a global phase gate followed by a layer of Hadamard gates followed by a global phase gate FIG. 1.

The kernel is the matrix of the fidelities of all pairs of data after they have been mapped to a quantum state after the feature map.

Shots(R) refers to the number of repetitions of a given measurement.

Training data T, is the labeled C={+1, −1} data that is needed to optimize (trained) the support vector machine Testing data S, is the new data that needs to be classified. The classification algorithm assigns a label to the new data after it has been optimized.

Quadratic program EQN3, is an optimization problem that can be solved efficiently in the size of the problem by a classical optimization routine.

Weights alpha_i are the output of the quadratic program

Support vectors N_S are the training data for which aipha_>0

Bias b is an additional parameter that can be obtained from the support vectors

The follow discloses an implementation of a non-limiting protocol in accordance with non-limiting training phase implementation(s).

Experimental Protocol—Training Phase

INPUT: training data T together with labels for each datum in the set C={+1,−1}

Configure quantum hardware.

Estimation of the quantum kernel K_ij

For all i,j=1 . . . |T| of data points x_i, x_j in the training set T

R times do:
  Reset qubits to the all 0 ground state
  Apply estimation circuit FIG. 3 for data x_i and x_j by sending the microwave pulses that generate the gates in FIG. 3
  Measure the output of the circuit with a read out pulse and record the result if all zeros has been obtained
Set K_ij number of zero outcomes divided by R
Provide the K matrix and the labeled data to the quadratic program.
OUTPUT optimal weights alpha_i, support vectors N_S and bias b.

The follow discloses an implementation of a non-limiting protocol in accordance with non-limiting classification phase implementation(s).

Experimental Protocol—Classification Phase

INPUT: new datum s from test set S, and support vectors a in N_S with labels k in C
Configure quantum hardware
Estimate the Kernel K_as between the new datum s and all support vectors a in N_S
  For all data points a in N_S
    R times do:
      Reset qubits to the all 0 ground state
      Apply estimation circuit FIG. 3 for data a and s by sending the microwave pulses that generate the gates in FIG. 3
      Measure the output of the circuit with a read out pulse and record the result if all zeros has been obtained
    Set K_as number of zero outcomes divided by R
Sum res=\sum_a y_a*alpha_a*K_as
OUTPUT new_label=sign(res)

Returning back to FIG. 1, aspects of the classical processor component 104 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the classical processor component 104 can also include memory 110 that stores computer executable components and instructions. Furthermore, the classical processor component 104 can include the processor 112 to facilitate execution of the instructions (e.g., computer executable components and corresponding instructions) by the classical processor component 104. As shown, the classifier component 108, the memory 110 and/or the processor 112 can be electrically and/or communicatively coupled to one another in one or more embodiments. In an embodiment, the classical processor component 104 can be a classical processor. In another embodiment, the classical processor component 104 can be a component of a classical processor. In yet another embodiment, the classical processor component 104 can be a component in communication with a classical processor. A classical processor as disclosed herein can be a machine that processes data based on binary digits and/or transistors. Furthermore, a quantum processor as disclosed herein can be a machine that processes data based on quantum bits and/or quantum mechanical phenomena associated with superposition and/or entanglement. Components as described herein can be hardware (including circuits), software, software in execution or a combination thereof.

The quantum processor 102 and the classical processor component 104 can be employed to provide a hybrid classical computing/quantum computing environment. For instance, the quantum processor 102 and the classical processor component 104 can be employed to perform one or more quantum computations associated with kernel prediction and classification. The quantum processor 102 can be a machine that performs a set of calculations based on principle of quantum physics. For instance, the quantum processor 102 can perform one or more quantum computations associated with a set of quantum gates. Furthermore, the quantum processor 102 can encode information using qubits. In an aspect, the quantum processor 102 can execute a set of instruction threads associated with circuit data.

The classical processor component 104 can be associated with a machine that performs a set of calculations based on binary digits and/or transistors. The classical processor component 104 can be communicatively coupled to the quantum processor 102. In one example, the classical processor component 104 can be communicatively coupled to the quantum processor 102 via a wired communication channel. In another example, the classical processor component 104 can be communicatively coupled to the quantum processor 102 via a wireless communication channel.

In certain embodiments, the classification component 108 can perform classifications, correlations, inferences and/or expressions associated with principles of artificial intelligence. For instance, the classification component 108 can employ an automatic classification system and/or an automatic classification. In one example, the classification component 108 can employ a probabilistic and/or statistical-based analysis (e.g., factoring into the analysis utilities and costs) to learn and/or generate inferences. The classification component 108 can employ any suitable machine-learning based techniques, statistical-based techniques and/or probabilistic-based techniques. For example, the classification component 108 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, classification component 108 can perform a set of machine learning computations. For example, the classification component 108 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

It is to be appreciated that the quantum processor 102 and/or the classical processor component 104 (e.g., the classification component 108) performs one or more quantum computation processes that cannot be performed by a human (e.g., is greater than the capability of a single human mind). For example, an amount of data processed, a speed of data processed and/or data types of data processed by the quantum processor 102 and/or the classical processor component 104 (e.g., classification component 108) over a certain period of time can be greater, faster and different than an amount, speed and data type that can be processed by a single human mind over the same period of time. The quantum processor 102 and/or the classical processor component 104 (e.g., classification component 108) can also be fully operational towards performing one or more other functions (e.g., fully powered on, fully executed, etc.) while also performing the above-referenced quantum feature map process and/or one or more simulation processes. Moreover, feature map or kernel data generated by the quantum processor 102 and/or the classical processor component 104 (e.g., classification component 108) can include information that is impossible to obtain manually by a user. For example, a type of information included quantum feature map or kernel data can be more complex than information obtained manually by a user.

Additionally, it is to be appreciated that the system 100 can provide various advantages as compared to classical computation techniques. For instance, an amount of time to perform a classical computation process can be reduced by employing the system 100. Furthermore, an amount of computational resources employed to perform a classical computation process can be reduced by employing the system 100. Accuracy of a classical computation can also be improved by employing the system 100. Additionally, an amount of error and/or noise associated with a classical computation can be reduced by employing the system 100. Moreover, quality of a classical processor can be improved, performance of a classical processor can be improved, efficiency of a classical processor can be improved, timing characteristics of a classical processor can be improved, power characteristics of a classical processor can be improved, and/or another characteristic of a classical processor can be improved by employing the system 100.

Figure 5:
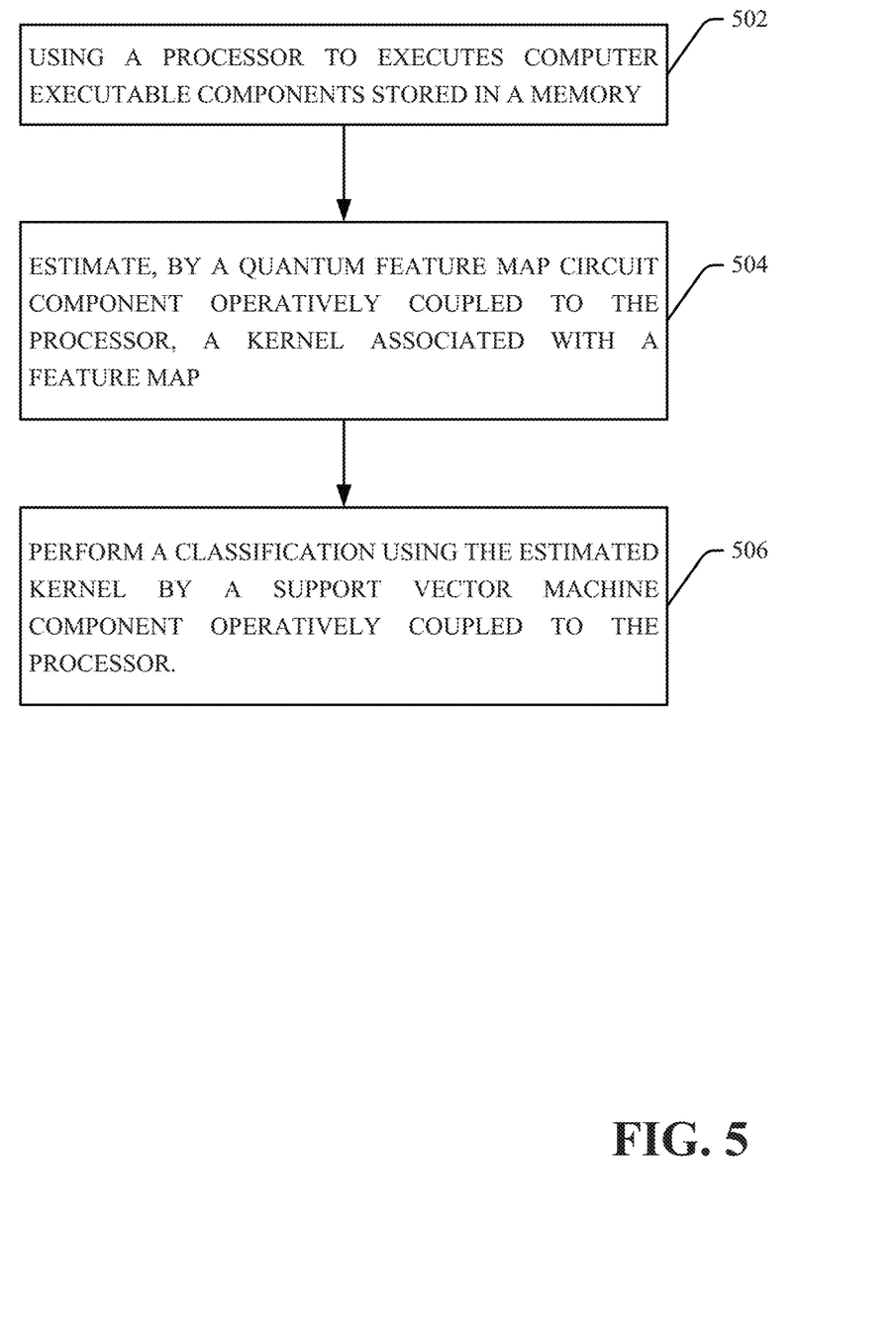
FIG. 5 illustrates a flow diagram of a non-limiting implementation.

FIG. 5 illustrates a flow diagram of a non-limiting implementation. At 502, a processor is used to execute computer executable components stored in a memory. At 504, an estimate is made, by a quantum feature map circuit component operatively coupled to the processor, of a kernel associated with a feature map. At 506, a classification is performed using the estimated kernel by a support vector machine component operatively coupled to the processor.

Figure 6:
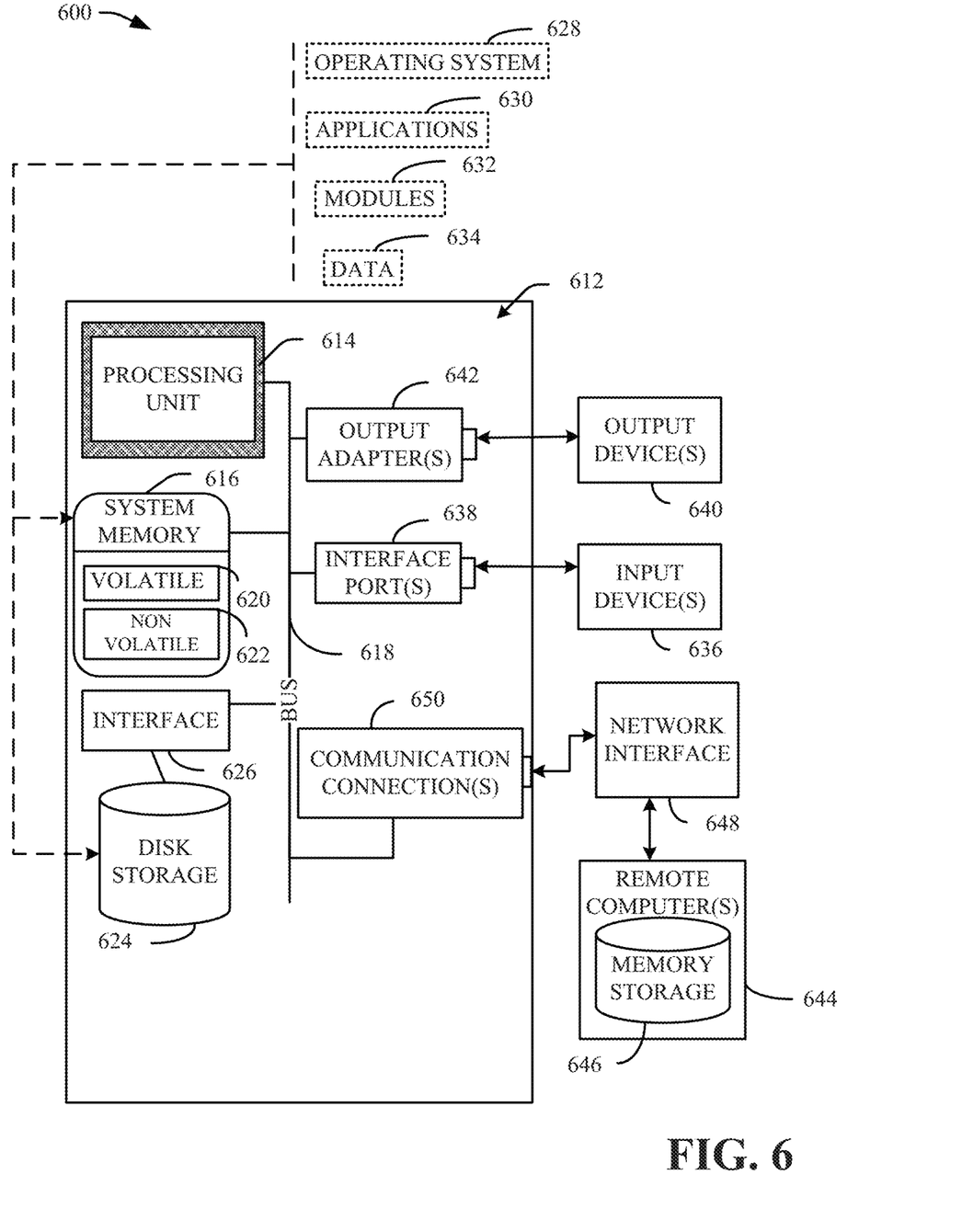
FIG. 6 illustrates a block diagram of an example, non-limiting operating environment in which one or more embodiments described herein can be facilitated.

In order to provide a context for the various aspects of the disclosed subject matter, FIG. 6 as well as the following discussion are intended to provide a general description of a suitable environment in which the various aspects of the disclosed subject matter can be implemented. FIG. 6 illustrates a block diagram of an example, non-limiting operating environment in which one or more embodiments described herein can be facilitated. Repetitive description of like elements employed in other embodiments described herein is omitted for sake of brevity.

With reference to FIG. 6, a suitable operating environment 600 for implementing various aspects of this disclosure can also include a computer 612. The computer 612 can also include a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614. The system bus 618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 616 can also include volatile memory 620 and nonvolatile memory 622. The basic input/output system (BIOS), containing the basic routines to transfer information between elements within the computer 612, such as during start-up, is stored in nonvolatile memory 622. Computer 612 can also include removable/non-removable, volatile/non-volatile computer storage media. FIG. 6 illustrates, for example, a disk storage 624. Disk storage 624 can also include, but is not limited to, devices like a magnetic disk drive, floppy disk drive, tape drive, Jaz drive, Zip drive, LS-100 drive, flash memory card, or memory stick. The disk storage 624 also can include storage media separately or in combination with other storage media. To facilitate connection of the disk storage 624 to the system bus 618, a removable or non-removable interface is typically used, such as interface 626. FIG. 6 also depicts software that acts as an intermediary between users and the basic computer resources described in the suitable operating environment 600. Such software can also include, for example, an operating system 628. Operating system 628, which can be stored on disk storage 624, acts to control and allocate resources of the computer 612.

System applications 630 take advantage of the management of resources by operating system 628 through program modules 632 and program data 634, e.g., stored either in system memory 616 or on disk storage 624. It is to be appreciated that this disclosure can be implemented with various operating systems or combinations of operating systems. A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port can be used to provide input to computer 612, and to output information from computer 612 to an output device 640. Output adapter 642 is provided to illustrate that there are some output devices 640 like monitors, speakers, and printers, among other output devices 640, which require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a computer, a server, a router, a network PC, a workstation, a microprocessor based appliance, a peer device or other common network node and the like, and typically can also include many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 650 refers to the hardware/software employed to connect the network interface 648 to the system bus 618. While communication connection 650 is shown for illustrative clarity inside computer 612, it can also be external to computer 612. The hardware/software for connection to the network interface 648 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor that executes computer executable components stored in a memory;
a quantum feature map circuit component that estimates a kernel associated with a feature map; and
a support vector machine component that performs a classification using the estimated kernel.

2. The system of claim 1, wherein the quantum feature map circuit component comprises a first layer of Hadamard gates operatively coupled to a first global phase gate operatively coupled to a second layer of Hadamard gates operatively coupled to a second global phase gate.

3. The system of claim 2, wherein the kernel is a matrix of data mapped to a quantum state after a feature map.

4. The system of claim 3, wherein the feature map is un-evaluable with fewer than exponential classical resources corresponding to available qubits of the quantum feature map circuit component.

5. The system of claim 4, wherein the quantum feature map circuit component is operable in a setting with bounded coherence.

6. The system of claim 2, wherein the first global phase gate is defined by a sequence of microwave pulses parameterized by waveform, amplitude and time.

7. The system of claim 6, wherein the second global phase gate is defined by a sequence of microwave pulses parameterized by waveform, amplitude and time.

8. The system of claim 2, wherein the first global phase gate is defined by a sequence of single and two qubit phase gates that entangle all qubits in the feature map.

9. A computer-implemented method comprising:
using a processor to executes computer executable components stored in a memory;
estimate, by a quantum feature map circuit component operatively coupled to the processor, a kernel associated with a feature map; and
perform a classification using the estimated kernel by a support vector machine component operatively coupled to the processor.

10. The computer-implemented method of claim 9, comprising executing the quantum feature map circuit component using a first layer of Hadamard gates operatively coupled to a first global phase gate operatively coupled to a second layer of Hadamard gates operatively coupled to a second global phase gate.

11. The computer-implemented method of claim 10, further comprising defining the first global phase gate by a sequence of microwave pulses parameterized by waveform, amplitude and time.

12. The computer-implemented method of claim 10, further comprising defining the second global phase gate by a sequence of microwave pulses parameterized by waveform, amplitude and time.

13. The computer-implemented method of claim 10, further comprising defining the first global phase gate by a sequence of single and two qubit phase gates that entangle all qubits in the feature map.

14. The computer-implemented method of claim 10, wherein the feature map is un-evaluable with fewer than exponential resources of available qubits.

15. A computer program product for facilitating quantum programming, the computer program product comprising a computer readable storage medium having program instructions embodied therewith, the program instructions executable by a processor to cause the processor to:
estimate, by the processor, a kernel associated with a feature map; and
perform, by the processor, a classification using the estimated kernel.

16. The computer program product of claim 15, the program instructions executable by the processor to cause the processor to: execute the quantum feature map circuit component using a first layer of Hadamard gates operatively coupled to a first global phase gate operatively coupled to a second layer of Hadamard gates operatively coupled to a second global phase gate.

17. The computer program product of claim 16, the program instructions executable by the processor to cause the processor to define the first global phase gate by a sequence of microwave pulses parameterized by waveform, amplitude and time.

18. The computer program product of claim 16, the program instructions executable by the processor to cause the processor to define the second global phase gate by a sequence of microwave pulses parameterized by waveform, amplitude and time.

19. The computer program product of claim 16, the program instructions executable by the processor to cause the processor to define the first global phase gate by a sequence of single and two qubit phase gates that entangle all qubits in the feature map.

20. The computer program product of claim 15, wherein the feature map is un-evaluable with fewer than exponential resources of available qubits.

* * * * *